(12) United States Patent
Kim

(10) Patent No.: US 10,890,487 B2
(45) Date of Patent: Jan. 12, 2021

(54) INTEGRATED POLARIZATION INTERFEROMETER AND SNAPSHOT SPECRO-POLARIMETER APPLYING SAME

(71) Applicant: INDUSTRIAL COOPERATION FOUNDATION CHONBUK NATIONAL UNIVERSITY, Jeollabuk-do (KR)

(72) Inventor: Dae Suk Kim, Jeollabuk-do (KR)

(73) Assignee: INDUSTRIAL COOPERATION FONDATION CHONBUK NATIONAL UNIVERSITY, Jeollabuk-Do (KR)

( * ) Notice: Subject to any disclaimer, the term of this patent is extended or adjusted under 35 U.S.C. 154(b) by 100 days.

(21) Appl. No.: 16/075,842

(22) PCT Filed: Jan. 26, 2017

(86) PCT No.: PCT/KR2017/000934
§ 371 (c)(1),
(2) Date: Sep. 7, 2018

(87) PCT Pub. No.: WO2017/135641
PCT Pub. Date: Aug. 10, 2017

(65) Prior Publication Data
US 2019/0049302 A1  Feb. 14, 2019

(30) Foreign Application Priority Data

Feb. 4, 2016 (KR) .......................... 10-2016-0013928

(51) Int. Cl.
*G01J 3/45* (2006.01)
*G01J 3/08* (2006.01)
(Continued)

(52) U.S. Cl.
CPC ............... *G01J 3/45* (2013.01); *G01J 3/0224* (2013.01); *G01J 3/0232* (2013.01);
(Continued)

(58) Field of Classification Search
CPC ...... G01J 3/447; G01J 4/45; G01J 3/45; G01J 3/08; G01J 3/0256; G01J 3/4531;
(Continued)

(56) References Cited

U.S. PATENT DOCUMENTS 4,802,768 A * 2/1989 Gifford ................ G01N 21/255
250/458.1
7,522,343 B2 * 4/2009 Hsieh ................... H04B 10/677
359/629

(Continued)

FOREIGN PATENT DOCUMENTS

DE    196 12 794 A1    10/1996
JP    2010-237203 A    10/2010
(Continued)

OTHER PUBLICATIONS

European Search Report for EP17747686.8 dated Sep. 3, 2019 from European patent office in a counterpart European patent application.
(Continued)

*Primary Examiner* — Michael P LaPage
(74) *Attorney, Agent, or Firm* — The PL Law Group, PLLC

(57) ABSTRACT

An integrated polarization interferometer includes a polarization beam splitter for separating incident complex waves, a first mirror attached to a first surface of the polarization beam splitter, for reflecting a first polarization transmitted through the polarization beam splitter to the polarization beam splitter, and a second mirror attached to a second surface of the polarization beam splitter, for reflecting a second polarization transmitted through the polarization
(Continued)

beam splitter to the polarization beam splitter. Accordingly, it is possible to measure dynamic spectroscopic polarization phenomenon with extremely high robustness disturbances due to an external vibration and the like by using the integrated polarization interferometer, thereby improving measurement repeatability and accuracy of measurement.

9 Claims, 6 Drawing Sheets

(51) Int. Cl.
    *G01J 3/02*     (2006.01)
    *G01J 3/453*     (2006.01)
    *G01J 3/447*     (2006.01)
    *G02B 27/28*     (2006.01)

(52) U.S. Cl.
    CPC ............... *G01J 3/0256* (2013.01); *G01J 3/08* (2013.01); *G01J 3/447* (2013.01); *G01J 3/4531* (2013.01); *G01J 3/4532* (2013.01); *G02B 27/28* (2013.01); *G02B 27/283* (2013.01)

(58) Field of Classification Search
    CPC ...... G01J 3/4532; G01J 3/0232; G01J 3/0224; G02B 27/28; G02B 27/283; G01N 21/01; G01N 21/21; G01N 21/27; G01N 2021/213; G01N 2201/0683
    See application file for complete search history.

(56) References Cited

U.S. PATENT DOCUMENTS

| | | | |
|---|---|---|---|
| 8,004,750 B1* | 8/2011 | Hsieh ................... | H04B 10/677 356/477 |
| 2002/0154314 A1* | 10/2002 | Copner .............. | G02B 6/29398 356/450 |
| 2006/0232781 A1* | 10/2006 | Kranz ................... | G01J 3/4532 356/451 |
| 2007/0115478 A1 | 5/2007 | Ray | |
| 2008/0002183 A1* | 1/2008 | Yatagai .............. | G01N 21/4795 356/73 |
| 2008/0285043 A1* | 11/2008 | Fercher .................. | A61B 3/102 356/451 |
| 2011/0032529 A1* | 2/2011 | Wan ......................... | G01J 3/02 356/451 |
| 2014/0078298 A1 | 3/2014 | Kudenov et al. | |

FOREIGN PATENT DOCUMENTS

| | | |
|---|---|---|
| KR | 2001-0113394 A | 12/2001 |
| KR | 10-2009-0063417 A | 6/2009 |
| KR | 10-1060053 B1 | 8/2011 |
| KR | 10-2012-0014355 A | 2/2012 |
| WO | WO 2006/086034 A2 | 8/2006 |

OTHER PUBLICATIONS

International Search Report for PCT/KR2017/000934 dated May 12, 2017.

* cited by examiner

Delta vs wavenum

194

CHOPPER SIZE MAY BE DETERMINED BY MOTOR SIZE

INTEGRATED POLARIZATION INTERFEROMETER AND SNAPSHOT SPECRO-POLARIMETER APPLYING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/000934, filed Jan. 26, 2017, which claims priority to the benefit of Korean Patent Application No. 10-2016-0013928 filed in the Korean Intellectual Property Office on Feb. 4, 2016, the entire contents of which are incorporated herein by reference.

TECHNICAL FIELD

The present invention relates to a spectro-polarimeter and a polarizing interferometer applicable thereto, and more particularly, to a spectro-polarimeter that rapidly measures a spectral Stokes vector that represents spectral polarization information of light that passes through or is reflected by an object being measured, and a polarizing interferometer applied thereto.

BACKGROUND ART

Spectropolarimetry is one of the most accurate solutions applicable to various fields. Some studies have been conducted to combine interferometry with polarimetry such as spectral domain polarization-sensitive optical coherence tomography (SD PS-OCT), real-time high-sensitivity surface-plasmon resonance (SPR) bio-sensing, circular dichroism (CD) measurement, and the like.

Typical spectropolarimetric system in the related art employs a mechanical rotating mechanism or an electrical modulation element to obtain spectroscopic ellipsometric parameters $\Psi(k)$ and $\Delta(k)$ for deriving the spectral Stokes vector and has a disadvantage of requiring measurement time of seconds or much longer periods. To solve the above disadvantage, snapshot-based interferometric spectropolarimetry has been developed. However, since the conventional snapshot-based interferometric spectropolarimetry is based on the principle of a conventional interferometer employing multiple-piece of optical scheme, the measurement with the conventional snapshot-based spectropolarimetry may be unstable due to disturbances caused by external vibration. Hence, the conventional snapshot-based spectropolarimetry may not provide high precision of measurement repeatability and stability that the conventional spectropolarimetric system employing a mechanical rotating mechanism or an electrical modulation element can provide.

SUMMARY

The present invention is directed to providing an integrated polarization interferometer that is highly robust to disturbances caused by external vibration, and a snapshot spectro-polarimeter employing the same.

One aspect of the present invention provides an integrated polarization interferometer that includes a polarizing beam splitter that splits incident complex waves, a first mirror attached to a first surface of the polarizing beam splitter and reflecting, to the polarizing beam splitter, first polarized light passing through the polarizing beam splitter, and a second mirror attached to a second surface of the polarizing beam splitter and reflecting, to the polarizing beam splitter, second polarized light reflected by the polarizing beam splitter.

An optical path length of the first polarized light may differ from an optical path length of the second polarized light in the integrated polarization interferometer.

A gap between the polarizing beam splitter and the first mirror may differ from a gap between the polarizing beam splitter and the second mirror.

The difference between the optical path length of the first polarized light and the optical path length of the second polarized light may range from 20 μm to 60 μm for an ultraviolet or visible light region and 60 μm to 500 μm for a near-infrared or infrared region.

The first polarized light may be P-polarized light, and the second polarized light to may be S-polarized light.

Another aspect of the present invention provides a snapshot spectro-polarimeter that includes a first linear polarizer that linearly-polarizes light emitted from a light source, an integrated polarization interferometer that polarization-modulates light that is output from the first linear polarizer and passes through an object, a second linear polarizer that causes two waves output from the integrated polarization interferometer to interfere with each other, and a measurement device that measures spectral polarization information of light output from the second linear polarizer. The integrated polarization interferometer includes a polarizing beam splitter that splits incident complex waves, a first mirror attached to a first surface of the polarizing beam splitter directly or with a spacer disposed therebetween and reflecting, to the polarizing beam splitter, first polarized light passing through the polarizing beam splitter, and a second mirror attached to a second surface of the polarizing beam splitter directly or with a spacer disposed therebetween and reflecting, to the polarizing beam splitter, second polarized light reflected by the polarizing beam splitter.

The first linear polarizer and the second linear polarizer may be linear polarizers oriented at 45°.

An optical path length of the first polarized light may differ from an optical path length of the second polarized light in the integrated polarization interferometer.

A gap between the polarizing beam splitter and the first mirror may differ from a gap between the polarizing beam splitter and the second mirror.

Another aspect of the present invention provides an integrated polarization interferometer that includes a beam splitter that splits incident complex waves, a first polarizer attached to a first surface of the beam splitter and polarizing light passing through the beam splitter, a first mirror that reflects, to the beam splitter, first polarized light output from the first polarizer, a second polarizer attached to a second surface of the beam splitter and polarizing light reflected by the beam splitter, and a second mirror that reflects, to the beam splitter, second polarized light output from the second polarizer.

Another aspect of the present invention provides a snapshot spectro-polarimeter that includes a linear polarizer that linearly-polarizes light emitted from a light source, an integrated polarization interferometer that modulates polarized light input from the linear polarizer, a beam splitter that splits interference waves modulated by the integrated polarization interferometer into two paths, a chopper wheel that periodically transmits first light split by the beam splitter to an object and periodically transmits second light split by the beam splitter to a path in which there is no object, and a measurement device that measures spectrum polarization information of the first light and the second light. The integrated polarization interferometer includes a polarizing beam splitter that splits polarized light input from the linear polarizer, a first mirror attached to a first surface of the polarizing beam splitter and reflecting, to the polarizing beam splitter, first polarized light passing through the polarizing beam splitter, and a second mirror attached to a second surface of the polarizing beam splitter and reflecting, to the polarizing beam splitter, second polarized light reflected by the polarizing beam splitter.

Another aspect of the present invention provides a snapshot spectro-polarimeter that includes a linear polarizer that linearly-polarizes light emitted from a light source, an integrated polarization interferometer that modulates polarized light input from the linear polarizer, a beam splitter that splits interference waves modulated by the integrated polarization interferometer, a first measurement device that measures spectral polarization information of first light that is split by the beam splitter and passes through, or is reflected by, an object, and a second measurement device that measures spectral polarization information of second light that is split by the beam splitter and does not pass through, or is not reflected by, the object. The integrated polarization interferometer includes a polarizing beam splitter that splits polarized light input from the linear polarizer, a first mirror attached to a first surface of the polarizing beam splitter and reflecting, to the polarizing beam splitter, first polarized light passing through the polarizing beam splitter, and a second mirror attached to a second surface of the polarizing beam splitter and reflecting, to the polarizing beam splitter, second polarized light reflected by the polarizing beam splitter.

According to embodiments of the present invention, an integrated polarization interferometer enables measurement of a spectral polarization phenomenon dynamically with extremely high robustness to disturbances caused by external vibration, thereby improving measurement repeatability and accuracy while having the dynamic measurement capability.

DETAILED DESCRIPTION

Hereinafter, the present invention will be described in more detail with reference to the accompanying drawings.

Figure 1:
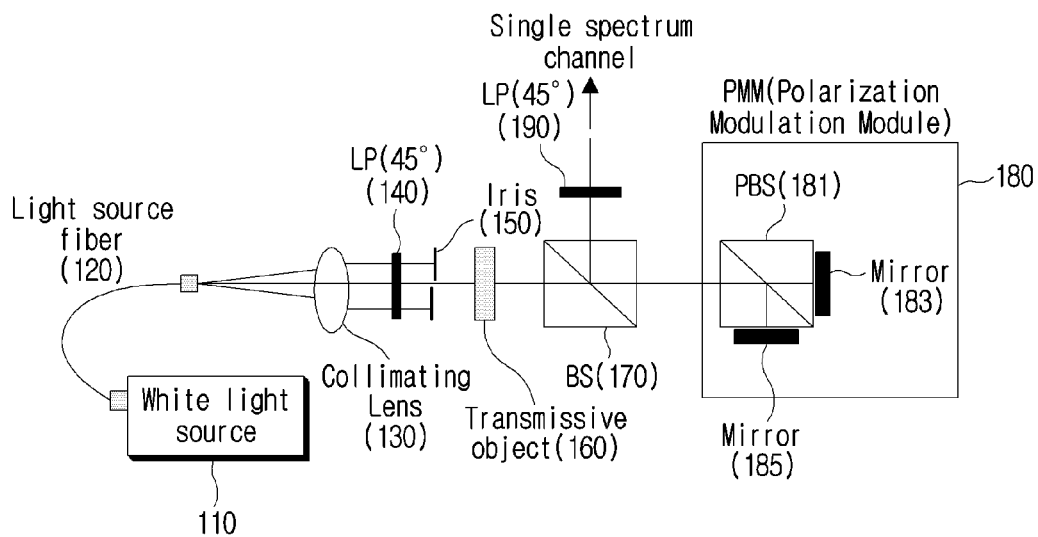
FIG. 1 is a diagram illustrating a snapshot spectro-polarimeter using an integrated polarization interferometer according to an embodiment of the present invention.

FIG. 1 is a diagram illustrating a snapshot spectro-polarimeter using an integrated polarization interferometer according to an embodiment of the present invention.

The snapshot spectro-polarimeter according to an embodiment of the present invention is a system for performing fast and real-time measurement of a spectral Stokes vector, which represents spectral polarization information of an object 160 being measured, by a snapshot method.

The snapshot spectro-polarimeter according to the embodiment of the present invention does not use a mechanically rotating mechanism or an electrical modulation element, and may measure the spectral Stokes vector, which has information about multiple wavelengths, in real time with only a single spectral interference data.

As illustrated in FIG. 1, the snapshot spectro-polarimeter according to the embodiment of the present invention includes a light source 110, a light source fiber 120, a collimating lens 130, a linear polarizer (LP) 140, an iris 150, a beam splitter (BS) 170, a polarization modulation module (PMM) 180, and a linear polarizer (LP) 190.

A white light source is used as the light source 110. For example, a 100 W tungsten-halogen lamp may be used as the light source 110. However, various other types of light sources may also be used as the light source 110.

Light emitted from the light source 110 is transmitted to the light source fiber 120 and then converted into collimated light by the collimating lens 130. The collimated light is linearly polarized at an angle of 45° by the LP 140. The iris 150 adjusts the magnitude of the linearly-polarized light passing through the LP 140.

The linearly-polarized light adjusted to have an appropriate magnitude by the iris 150 passes through the anisotropic transmissive object 160 being measured, passes through the BS 170, and then enters the PMM 180.

The PMM 180 is an integrated polarization interferometer that polarization-modulates waves passing through the object 160. As illustrated in FIG. 1, the PMM 180 includes a polarizing beam splitter (PBS) 181 and mirrors 183 and 185.

The PBS 181 splits incident complex waves. P-polarized light passes through PBS 181 and is incident on the mirror 183, and S-polarized light is reflected by the PBS 181 and is incident on the mirror 185.

The mirrors 183 and 185 are fixedly attached to the PBS 181. Specifically, the mirror 183 is attached to a side surface of the PBS 181 and reflects the P-polarized light passing through the PBS 181, and the mirror 185 is attached to a bottom surface of the PBS 181 and reflects the S-polarized light reflected by the PBS 181.

To generate a high-frequency signal in a spectrum polarization signal, it is needed to generate the difference between the optical path length of the P-polarized light and the to optical path of the S-polarized light, wherein the P-polarized light has the optical path of passing through the PBS 181, being reflected by the mirror 183, and then passing through the PBS 181 in the PMM 180, and the S-polarized light has the optical path of being reflected by the PBS 181 and the mirror 185 and then being reflected again by the PBS 181. That is, one optical path length is longer than the other optical path length. For example, the one optical path length may be longer than the other optical path length by 20 μm to 60 μm when the measurement wavelength region corresponds to an ultraviolet region or a visible light region and by 60 µm to 500 µm when the measurement wavelength region corresponds to a near-infrared region or an infrared region.

The optical path length of the P-polarized light may be longer than that of the S-polarized light, or the optical path length of the S-polarized light may be longer than that of the P-polarized light.

To make the optical path length difference, the gap between the PBS 181 and the mirror 183 differs from the gap between the PBS 181 and the mirror 185. That is, one of the mirrors 183 and 185 is farther away from the PBS 181 than the other. The one mirror is farther away from the PBS 181 than the other mirror by 20 µm to 60 µm when the measurement wavelength region corresponds to the ultraviolet region or the visible light region and by 60 µm to 500 µm when the measurement wavelength region corresponds to the near-infrared region or the infrared region.

For the gap difference of 20 µm to 60 µm or 60 µm to 500 µm, the two mirrors 183 and 185 may be accurately arranged to have the suitable optical path difference of 20 µm to 60 µm or 60 µm to 500 µm, or a spacer having a thickness corresponding to the optical path difference may be inserted between the mirrors 183 and 185.

Meanwhile, the PMM 180 may be implemented with a combination of a non-polarizing beam splitter (NPBS), two polarizers, and two mirrors, rather than the combination of the PBS 181 and the two mirrors 183 and 185. Such a combination is illustrated in FIG. 2.

Figure 2:
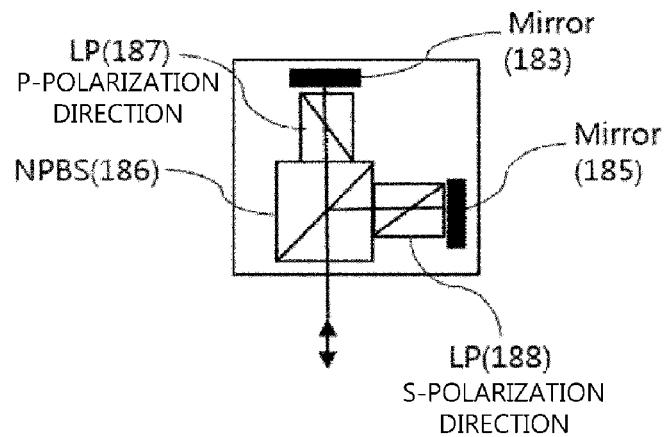
FIG. 2 is a diagram illustrating an integrated polarization interferometer according to another embodiment of the present invention.

FIG. 2 illustrates a structure in which the PBS 181 illustrated in FIG. 1 is replaced with a combination of two LPs 187 and 188, the polarization directions of which are perpendicular to each other, integrally attached to two beam paths split by an NPBS 186. The PBS may have a limitation in precise polarization measurement performance because the PBS has a limited polarization extinction ratio of about 1/1000. Therefore, the PBS may be replaced with the combination of the NPBS and the two polarizers, resulting in a high extinction ratio.

Mirrors 183 and 185 are fixedly attached to the LPs 187 and 188, respectively, and in order to make an optical path length difference, a gap between the LP (P-polarization direction) 187 and the mirror 183 differs from a gap between the LP (S-polarization direction) 188 and the mirror 185.

The following description will be given with reference to FIG. 1.

The two waves polarization-modulated by the PMM 180 are reflected by the BS 170 and then linearly polarized at an angle of 45° by the LP 190 to interfere with each other. The interference waves enter a single spectrum sensing module (not illustrated). The single spectrum sensing module may be a spectrometer of a sensor array type.

The LP 140 included in the snapshot spectro-polarimeter according to an embodiment of the present invention is a component for improving contrast of light interference.

The single spectrum sensing module measures a spectral Stokes vector, which represents spectrum polarization information of an anisotropic transmissive element, by a snapshot method.

Hereinafter, an interference phenomenon caused by polarization modulation in the integrated polarization interferometer, which is implemented with the PMM 180, will be described in detail using the following equations.

Spectrum polarization information measured by the single spectrum sensing module may be represented by Equation 1.

$$I_{45°}(k) = (E_{p\_45°}(k) + E_{s\_45°}(k))(E_{p\_45°}(k) + E_{s\_45°}(k)) \quad (1)$$

Here, a wave number k is equal to $2\pi/\lambda$, and $E_{p\_45°}(k)$ and $E_{s\_45°}(k)$ are 45° components for complex waves of $E_p(k)$ and $E_s(k)$ that are represented by Equation 2.

$$E_p(k) = B_{NP}B_PB_{NP}E_{in}(k)e^{ikz_D} = \frac{1}{2}B_{NP}\begin{bmatrix}1\\0\end{bmatrix}B_{NP}E_{in}(k)e^{ikz_p} \quad (2)$$

$$E_s(k) = B_{NP}B_PB_{NP}E_{in}(k)e^{ikz_D} = \frac{1}{2}B_{NP}\begin{bmatrix}0\\1\end{bmatrix}B_{NP}E_{in}(k)e^{ikz_s}$$

Here, $E_{in}(k)$ represents input waves at an entrance of the integrated polarization interferometer. $E_p(k)$ is P-polarized light that passes through the PBS 181 and is reflected by the mirror 183, and $E_s(k)$ is S-polarized light that is reflected by the PBS 181 and the mirror 185. $z_p$ and $z_s$ represent optical path lengths of the P-polarized light and the S-polarized light in the integrated polarization interferometer, respectively.

Meanwhile, a spectrum interference signal in the absence of the object 160 is represented by Equation 3.

$$I_{45}^{no\_object}(k) = |E_{p\_45°}|^2 + |E_{s\_45°}|^2 + 2\gamma|E_{p\_45°}||E_{s\_45°}| \cos[\Phi^{no\_object}(k)] \quad (3)$$

Here, $\Phi^{no\_object}(k) = kz_0 + [\xi(k) - \eta(k)]$

Here, $z_0 = |z_p - z_s|$ is an optical path length difference. The optical path difference between $z_p$ and $z_s$ generates high-frequency spectral interference that is required to obtain a spectral polarimetric phase by using a snapshot scheme. The spectral polarimetric phase function $\Phi^{no\_object}(k)$ may be derived using Fourier transform technique or direct phase calculation that is applied to the spectral domain.

A spectral interference signal in the presence of the object 160 is represented by Equation 4.

$$I_{45}^{object}(k) = |E_{p\_45°}|^2 + |E_{s\_45°}|^2 + 2\gamma|E_{p\_45°}||E_{s\_45°}| \cos[\Phi^{object}(k)] \quad (4)$$

Here, $\Phi^{object}(k) = kz_0 + [\xi(k) - \eta(k)] + [\delta_p(k) - \delta_s(k)]$ For a case in which the transmissive object 16 is not present and a case in which the transmissive object 16 is present, incident waves $E_{in}(k)$ at the entrance of the integrated polarization interferometer are represented by Equation 5.

$$E_{in}^{no\_object}(k) = \begin{bmatrix}u(k)e^{i\xi(k)}\\v(k)e^{i\eta(k)}\end{bmatrix}, E_{in}^{object}(k) = \begin{bmatrix}u(k)|t_p|e^{i[\xi(k)+\delta_p(k)]}\\v(k)|t_s|e^{i[\eta(k)+\delta_s(k)]}\end{bmatrix} \quad (5)$$

The spectral polarimetric phase function $\Phi^{object}(k)$ may be derived using the aforementioned Fourier transform technique. The spectral polarimetric phase difference $\Delta_a(k)$ caused by the object 160 is calculated by subtracting $\Phi^{no\_object}(k)$ from $\Phi^{object}(k)$ as in Equation 6.

$$\Delta_a(k) = \delta_p(k) - \delta_s(k) = \Phi^{object}(k)\Phi^{no\_object}(k) \quad (6)$$

Figure 3:
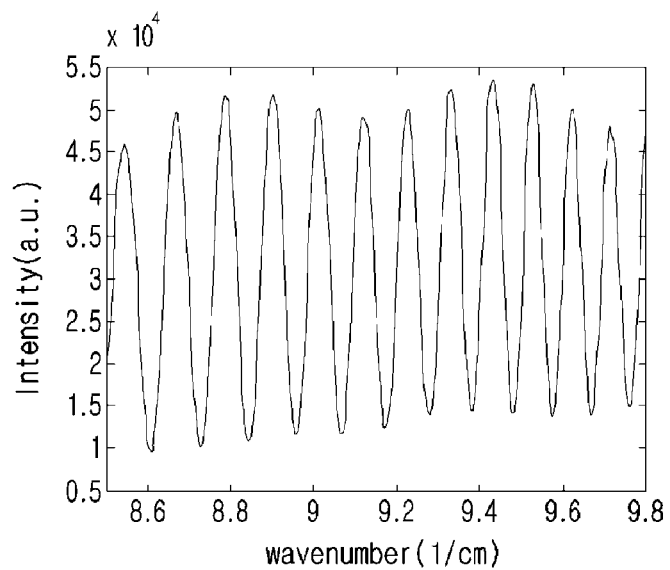
FIG. 3 illustrates spectral interference data measured by a single spectrum sensing module in the absence of an object.
Figure 4:
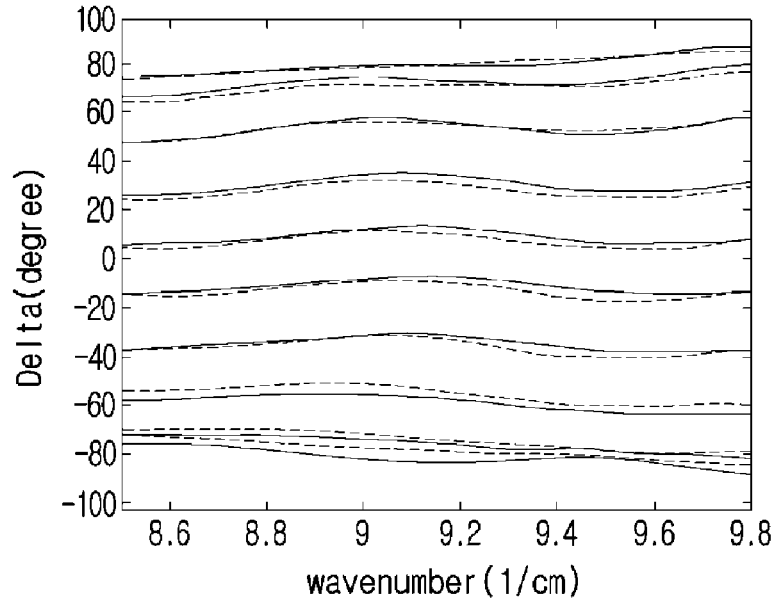
FIG. 4 illustrates results obtained by measuring a spectral polarimetric phase difference $\Delta_a(k)$ by rotating a quarter wave plate (QWP) placed at the object position every 10°.

FIG. 3 illustrates spectral interference data measured by the single spectrum sensing module when the object 160 is not present, and FIG. 4 illustrates results obtained by measuring the spectral polarimetric phase difference $\Delta_a(k)$ by rotating a quarter wave plate (QWP) placed at the object 160 position every 10°.

In FIG. 4, the solid line represents measurement results obtained by using a technique according to an embodiment of the present invention, and the dotted line represents measurement results obtained using a commercial mechanical polarization element type system. It can be seen that there is no significant difference therebetween.

Figure 5:
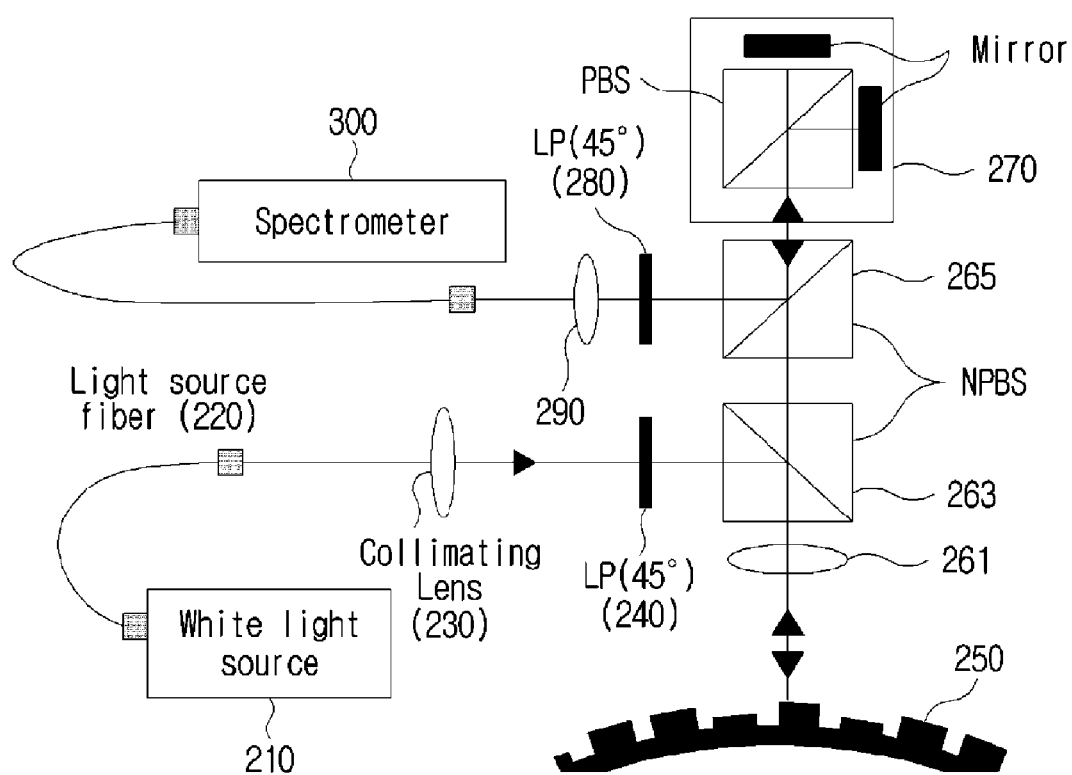
FIG. 5 is a diagram illustrating a snapshot spectro-polarimeter using an integrated polarization interferometer according to another embodiment of the present invention.

FIG. 5 is a diagram illustrating a snapshot spectro-polarimeter using an integrated polarization interferometer according to another embodiment of the present invention.

The snapshot spectro-polarimeter illustrated in FIG. 5 structurally differs from the system illustrated in FIG. 1 in that the former is a system for measuring spectral polarization information about a reflective sample such as a nano pattern, a roll nano pattern, and the like, whereas the latter is a system for measuring spectral polarization information about a transmissive sample.

Among components illustrated in FIG. 5, a light source 210, a light source fiber 220, a collimating lens 230, an LP 240, a PMM 270, and an LP 280 may be implemented to be equivalent to, respectively, the light source 110, the light source fiber 120, the collimating lens 130, the LP 140, the PMM 180, and the LP 190 illustrated in FIG. 1.

A lens 261 and NPBSs 263 and 265 are components for transmitting light linearly polarized by the LP 240 to a reflective object 250 being measured, allowing complex waves output from the reflective object 250 to enter the PMM 270, and allowing two waves polarization-modulated by the PMM 270 to enter the LP 280.

The two waves entering the LP 280 are linearly polarized at an angle of 45° to interfere with each other, and the interference waves enter a spectrometer 300 through a lens 290.

The exemplary embodiments of the snapshot spectro-polarimeters using the integrated polarization interferometers have hitherto been described in detail.

The spectral polarimetric phase difference $\Delta_a(k)$ caused by the object 160 in FIG. 1 is calculated by subtracting $\Phi^{no\_object}(k)$ from $\Phi^{object}(k)$, as in Equation 6. That is, the spectral polarimetric phase difference $\Delta_a(k)$, which is an accurate spectral polarimetric phase difference of an object being measured, may be obtained by performing compensation using the measurement results in the absence of the object.

However, since the spectral polarimetric phase function $\Phi^{no\_object}(k)$ in the absence of an object is slightly changed by disturbances such as a temperature change in the atmosphere, environment control, such as isothermal-isohumidity control, is required for high-precision measurement.

To perform stable precision measurement which highly robust to disturbances in general environmental condition in which an isothermal-isohumidity control system is not present, it is necessary to simultaneously measure $\Phi^{no\_object}(k)$ in the absence of an object and $\Phi^{object}(k)$ in the presence of object, rather than measuring $\Phi^{no\_object}(k)$ only once.

Figure 6:
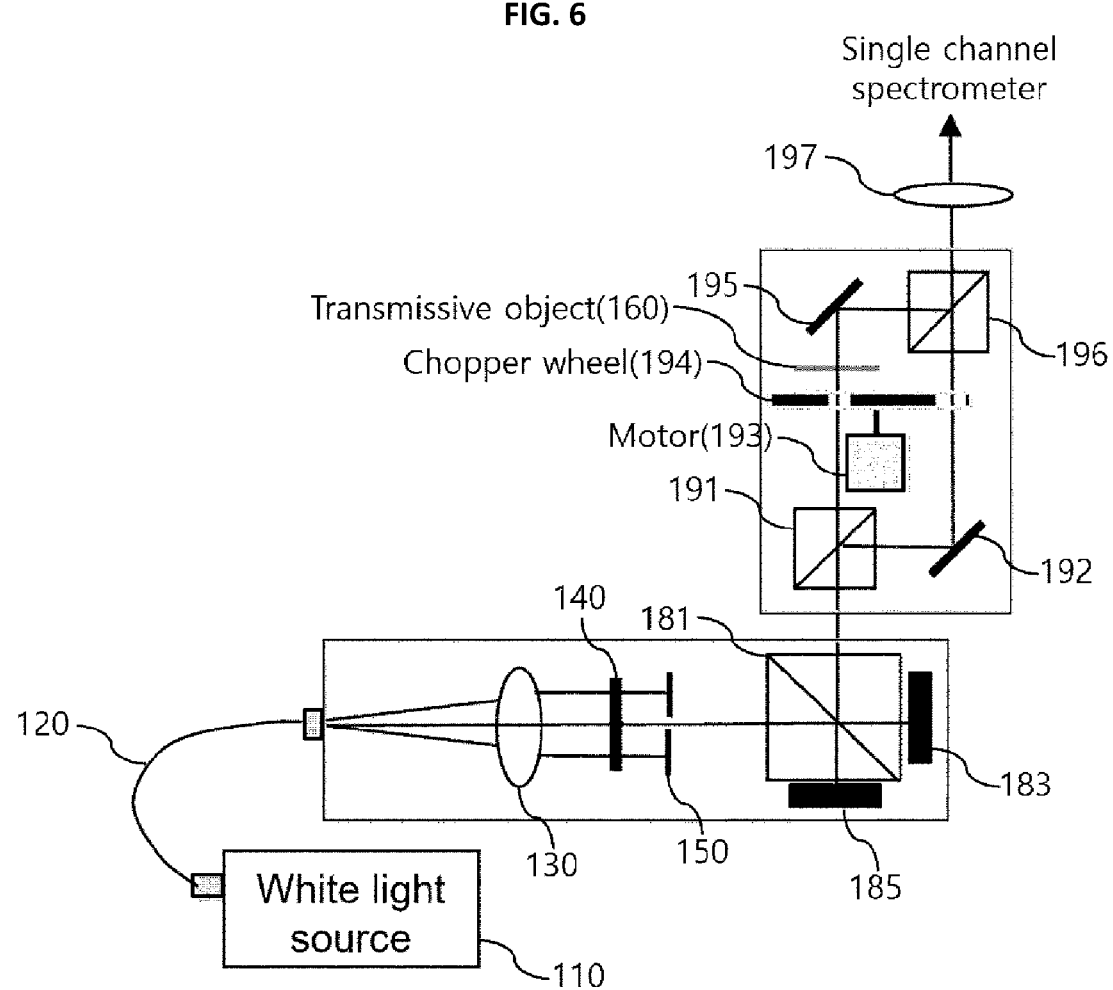
FIG. 6 is a diagram illustrating a snapshot spectro-polarimeter using an integrated polarization interferometer according to still another embodiment of the present invention.

FIG. 6 is a diagram illustrating a snapshot spectro-polarimeter that is capable of achieving measurement accuracy and repeatability of an integrated polarization interferometer even in general environmental condition. The snapshot spectro-polarimeter according to the embodiment of the present invention consecutively measures $\Phi^{object}(k)$ and $\Phi^{no\_object}(k)$ by rotating a chopper wheel 194 at constant speed using a motor, rather than separately performing the measurement for the case in which an object is present and the measurement for the case in which an object is not present. The spectral polarimetric phase difference $\Delta_a(k)$ is obtained by simultaneously measuring $\Phi^{object}(k)$ and $\Phi^{no\_object}(k)$ while rotating the chopper wheel 194 at a rotational speed of about 30 to 60 rounds per minute (RPM).

As illustrated in FIG. 6, in order to achieve the above operations, interference waves modulated by the integrated polarization interferometer are split into two paths by a beam splitter (NPBS) 191. A transmissive object 160 to be measured is located in one path, and there is no object in the other path reflected by a mirror 192.

Light passing through the object 160 is reflected by a mirror 195 and then reflected by an NPBS 196 and enters a spectrometer through a lens 197. The remaining to light, which does not pass through the object 160, passes through the NPBS 196 and enters the spectrometer through the lens 197.

Figure 7:
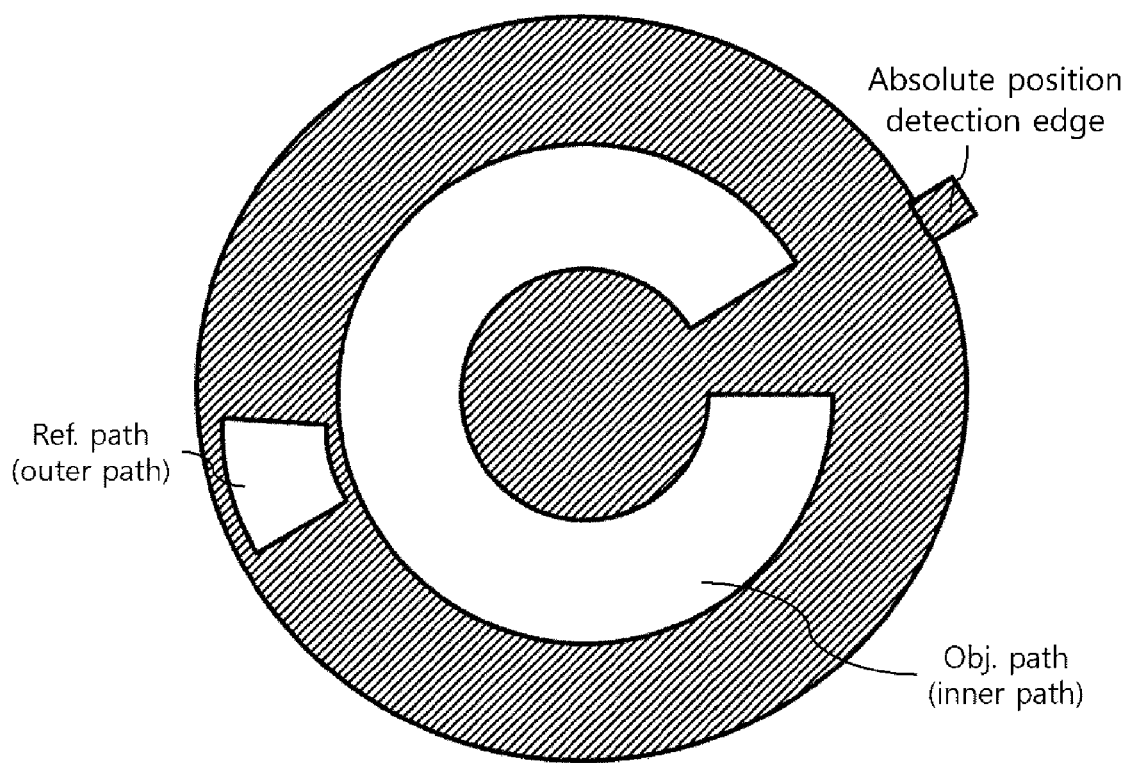
FIG. 7 is a structural view of a chopper wheel illustrated in FIG. 6.

Meanwhile, as can be seen from the structure of the chopper wheel 194 in FIG. 7, when only an interference wave signal in one path enters the spectrometer, the snapshot spectro-polarimeter may measure $\Phi^{no\_object}(k)$ when the chopper wheel 914 is rotated through one revolution by a motor 193. For example, assuming that the chopper wheel 914 rotates one revolution per second, light not passing through the object 160 periodically enters the spectrometer every one second to allow measurement of $\Phi^{no\_object}(k)$, thereby resulting in robustness to slowly changed external disturbances, such as a temperature change.

Although the embodiment of the present invention is related to a transmissive object, the same method may also be applied to a reflective object with a normal incidence or any specific incidence angle.

Figure 8:
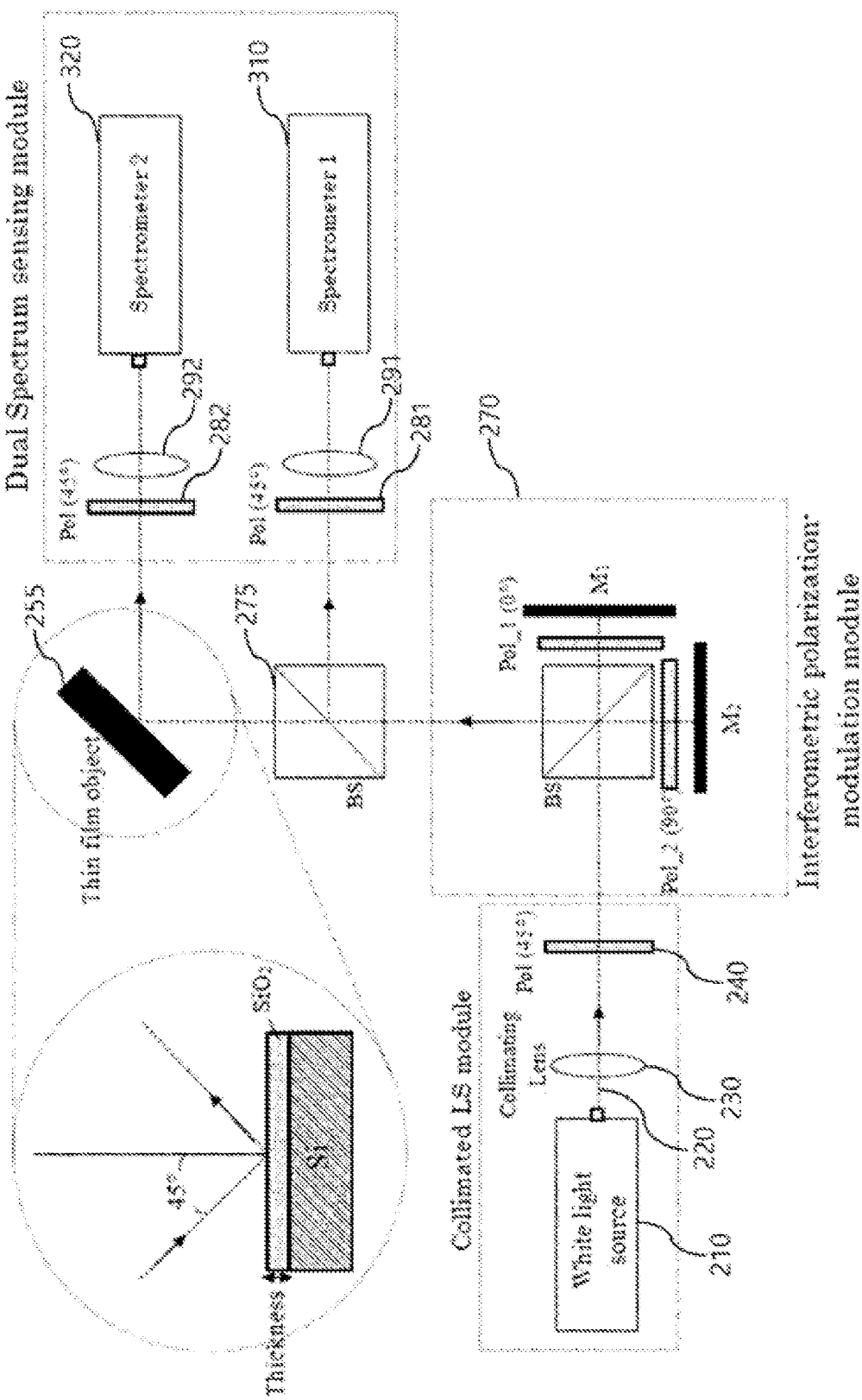
FIG. 8 is a diagram illustrating a snapshot spectro-polarimeter using an integrated polarization interferometer according to another embodiment of the present invention.

FIG. 8 illustrates a snapshot spectro-polarimeter capable of achieving performance of a high-precision integrated polarization interferometer in a normal environment, according to another embodiment of the present invention. Provided is a method for simultaneously measuring spectral polarization-modulated signals based on two spectrometers 310 and 320, instead of using the chopper wheel scheme.

Although a reflective object 255 with an incidence angle of 45° is used in the embodiment of the present invention, the same method may also be applied to a transmissive object and a vertical-incidence object.

In the embodiment of the present invention, interference waves output through the integrated polarization interferometer are split into two paths by a beam splitter (NPBS) 275 located in front of a thin-film object to be measured at an incidence angle of 45°. In one path, $\Phi^{no\_object}(k)$ is measured after interference waves not being reflected by the object 255 are obtained using the spectrometer 1 310, and in the other path, $\Phi^{object}(k)$ is measured after interference waves reflected by the object 255 are obtained using the spectrometer 2 320.

Figure 9:
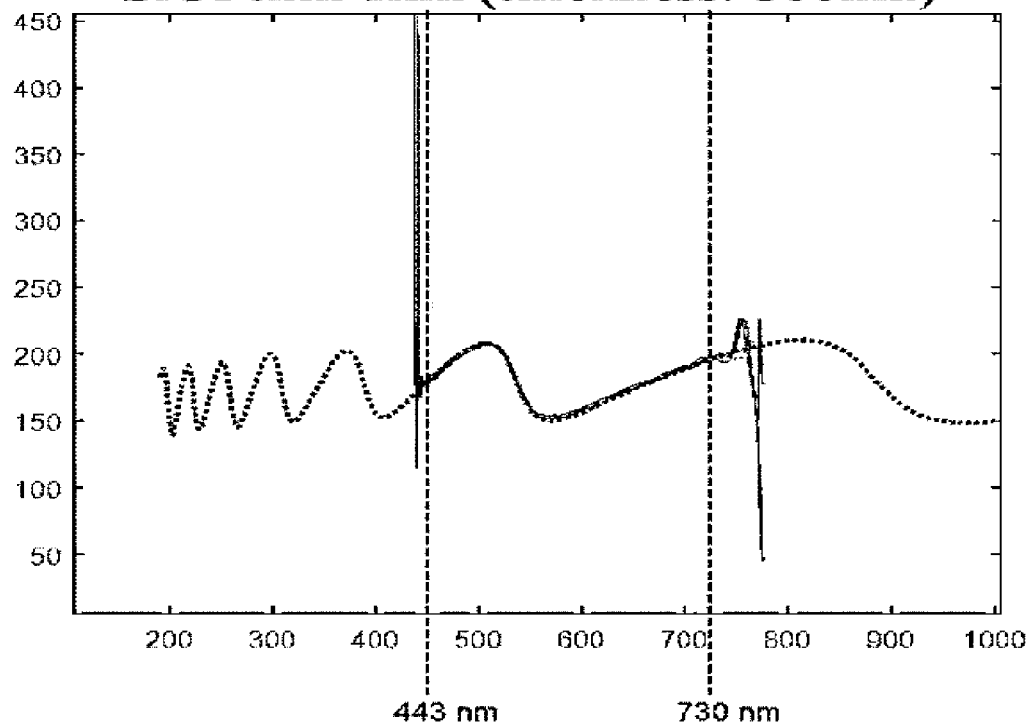
FIG. 9 is a graph depicting results obtained by measuring a spectral polarimetric phase difference $\Delta_a(k)$ of a 500-nm silicon oxide thin-film object using the configuration illustrated in FIG. 8.

FIG. 9 illustrates results obtained by measuring a spectral polarimetric phase difference $\Delta_a(k)$ of a 500-nm silicon oxide thin-film using the configuration illustrated in FIG. 8, wherein the measured result matches well with that measured by a commercial spectro-polarimeter shown by a dotted line. An optical system in a visible light region is used in the embodiment of the present invention, and only a part of the results for the wavelength range of 443 nm to 730 nm is compared with the results of the commercial product.

The visible light region of 443 nm to 730 nm, described above as a measurement wavelength region, is merely illustrative. It should be understood that the spirit of the present invention may also be applied to an ultraviolet region of 200 nm to 400 nm and a near-infrared and infrared regions of about 700 nm to 25 microns.

Although the exemplary embodiments of the present invention have been described above, the present invention is not limited to the above-described specific embodiments, and those skilled in the art will appreciate that various modifications, additions, and substitutions are possible, without departing from the scope and spirit of the invention as disclosed in the accompanying claims. In addition, these modifications and variations should not be understood separately from the technical ideas or prospects of the present invention.

The invention claimed is:

1. An integrated polarization interferometer comprising:
a polarizing beam splitter configured to split incident complex waves;
a first mirror facing a first surface of the polarizing beam splitter and configured to reflect, to the polarizing beam splitter, first polarized light passing through the polarizing beam splitter; and
a second mirror facing a second surface of the polarizing beam splitter and configured to reflect, to the polarizing beam splitter, second polarized light reflected by the polarizing beam splitter,
wherein an optical path length of the first polarized light differs from an optical path length of the second polarized light in the integrated polarization interferometer; and
the difference between the optical path length of the first polarized light and the optical path length of the second polarized light ranges from 20 μm to 60 μm for an ultraviolet or visible light region and 60 μm to 500 μm for a near-infrared or infrared region.

2. The integrated polarization interferometer of claim 1, wherein the first polarized light is P-polarized light, and the second polarized light is S-polarized light.

3. A snapshot spectro-polarimeter comprising:
a first linear polarizer configured to linearly-polarize light emitted from a light source;
the integrated polarization interferometer of claim 1 to polarization-modulate complex waves that are output from the first linear polarizer and pass through, or are reflected by, an object;
a second linear polarizer configured to cause two waves output from the integrated polarization interferometer to interfere with each other; and
a measurement device configured to measure spectrum polarization information of light output from the second linear polarizer,
wherein the measurement device comprises a spectrometer of a sensor array type.

4. The snapshot spectro-polarimeter of claim 3, wherein the first linear polarizer and the second linear polarizer are linear polarizers oriented in the same direction.

5. The snapshot spectro-polarimeter of claim 3, wherein a measurement wavelength region of the measurement device comprises at least one of a visible light region, an ultraviolet region, a near-infrared region, and an infrared region.

6. A snapshot spectro-polarimeter comprising:
a linear polarizer configured to linearly-polarize light emitted from a light source;
the integrated polarization interferometer of claim 1 to modulate polarized light input from the linear polarizer;
a beam splitter configured to split interference waves modulated by the integrated polarization interferometer;
a first measurement device configured to measure spectral polarization information of first light that is split by the beam splitter and passes through, or is reflected by, an object; and
a second measurement device configured to measure spectral polarization information of second light that is split by the beam splitter and does not pass through, or is not reflected by, the object.

7. The snapshot spectro-polarimeter of claim 6, wherein measurement wavelength regions of the first measurement device and the second measurement device comprise at least one of a visible light region, an ultraviolet region, a near-infrared region, and an infrared region.

8. A snapshot spectro-polarimeter comprising:
a linear polarizer configured to linearly-polarize light emitted from a light source;
an integrated polarization interferometer configured to modulate polarized light input from the linear polarizer;
a beam splitter configured to split interference waves modulated by the integrated polarization interferometer into two paths;
a chopper wheel configured to periodically transmit first light split by the beam splitter to an object and periodically transmit second light split by the beam splitter to a path in which there is no object; and
a measurement device configured to measure spectral polarization information of the first light and the second light,
wherein the integrated polarization interferometer comprises:
a polarizing beam splitter configured to split polarized light input from the linear polarizer;
a first mirror facing a first surface of the polarizing beam splitter to reflect, to the polarizing beam splitter, first polarized light passing through the polarizing beam splitter; and
a second mirror facing a second surface of the polarizing beam splitter to reflect, to the polarizing beam splitter, second polarized light reflected by the polarizing beam splitter,
wherein an optical path length of the first polarized light differs from an optical path length of the second polarized light in the integrated polarization interferometer; and
the difference between the optical path length of the first polarized light and the optical path length of the second polarized light ranges from 20 μm to 60 μm for an ultraviolet or visible light region and 60 μm to 500 μm for a near-infrared or infrared region.

9. The snapshot spectro-polarimeter of claim 8, wherein a measurement wavelength region of the measurement device comprises at least one of a visible light region, an ultraviolet region, a near-infrared region, and an infrared region.

* * * * *